United States Patent [19]

Kneafsey et al.

[11] Patent Number: 4,867,817

[45] Date of Patent: Sep. 19, 1989

[54] METHOD AND DEVICE FOR ACTIVATING CHEMICAL COMPOSITIONS

[75] Inventors: Brendan J. Kneafsey, Dublin, Ireland; John M. Rooney, South Glastonbury, Conn.; Conor F. MacAogain, Dublin, Ireland

[73] Assignee: Loctite (Ireland) Limited, Dublin, Ireland

[21] Appl. No.: 930,194

[22] Filed: Feb. 4, 1987

[30] Foreign Application Priority Data

Nov. 21, 1985 [IE] Ireland .................................. 2919/85

[51] Int. Cl.⁴ .......................... B05D 1/00; B05D 3/12
[52] U.S. Cl. .................................. 156/73.1; 118/612;
156/73.6; 156/155; 156/578; 427/57
[58] Field of Search ...................... 156/73.1, 73.6, 155,
156/578; 427/57; 118/612; 204/157.82;
430/211, 138; 428/211; 239/102.1

[56] References Cited

U.S. PATENT DOCUMENTS

| 3,860,565 | 1/1975 | Barber | 204/157.82 |
| 4,416,966 | 11/1983 | Sanders et al. | 430/138 |
| 4,488,665 | 12/1984 | Cocks et al. | 222/146.5 |
| 4,551,407 | 11/1985 | Sanders | 430/138 |
| 4,554,235 | 11/1985 | Adair et al. | 430/138 |
| 4,578,339 | 3/1986 | Adkins | 430/211 |
| 4,621,040 | 11/1986 | Viola | 430/138 |
| 4,622,282 | 11/1986 | Head et al. | 428/211 |
| 4,627,990 | 12/1986 | Saga et al. | 427/57 |
| 4,649,060 | 3/1987 | Ishikawa et al. | 427/57 |

FOREIGN PATENT DOCUMENTS

| 5722 | 10/1986 | PCT Int'l Appl. | 239/102.1 |
| 973178 | 11/1982 | U.S.S.R. | 239/102.1 |
| 1345896 | 2/1974 | United Kingdom | 239/102.1 |

Primary Examiner—Merrell C. Cashion, Jr.
Attorney, Agent, or Firm—Edward K. Welch, II; Eugene F. Miller

[57] ABSTRACT

Chemical compositions such as adhesive, sealing or coating compositions containing one or more microencapsulated ingredients are activated by directly contacting an ultrasonic device (2) to the composition (8) and sonicating the composition to rupture the microcapsules. The method may be carried out in a sonication chamber (1) in which the ultrasonic device (2) is immersed in the composition (8) and from which the composition flows before it sets. Alternatively the ultrasonic energy may be applied to the composition in situ.

6 Claims, 1 Drawing Sheet

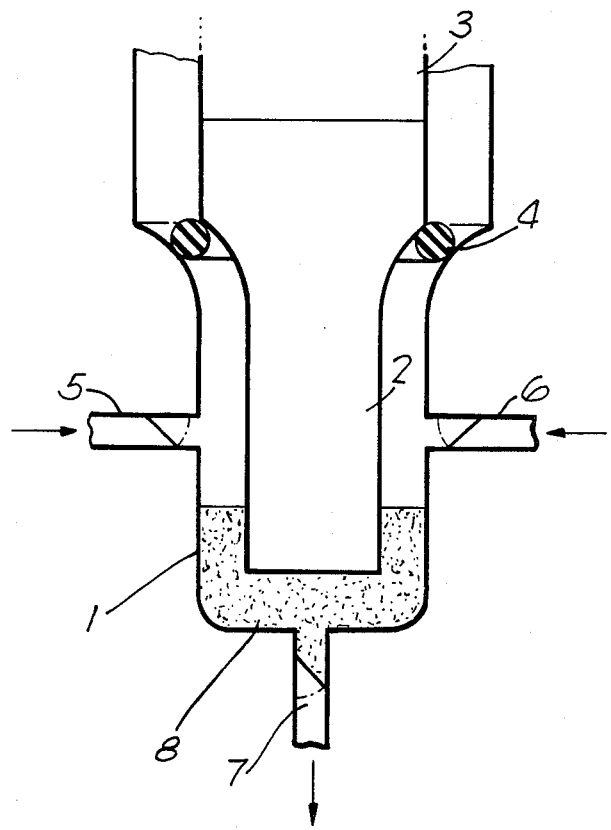

METHOD AND DEVICE FOR ACTIVATING CHEMICAL COMPOSITIONS

BACKGROUND OF THE INVENTION

1. 1. Field of the Invention

The invention relates to a method of activating chemical compositions in which one or more of the active ingredients is microencapsulated by ultrasonically rupturing the microcapsules. The method is particularly suitable for activating adhesive, sealant or coating compositions.

2. Description of Related Art

It is known to incorporate microencapsulated active ingredients in such compositions. Active ingredients would include, for example, resins and monomers as well as primers, activators, accelerators or initiators. For example, German Pat. No. 2,023,999 and U.S. Pat. No. 3,826,756 teach microencapsulation of certain scrylic monomers; German Pat. No. 2,629,889 teaches microencapsulation of ferrocene activators; Japanese U.S. Pat. No. 85/07,931 discloses microencapsulation of acrylic monomers by photpolymerization techniques; German Patent No. 3,401,056 discloses microencapsulation of solvent activators for adhesives; Japanese Pat. No. 84/01,506 discloses microencapsulation of latent hardeners for epoxy adhesives; European Pat. No. 63,475 discloses microencapsulation of cross-linking agents for epoxy adhesives; Japanese Pat. No. 82/12,039 discloses microencapsulation of certain catalysts for polymerization of acrylic monomers; Japanese Pat. No. 78/31,579 and Japanese Pat. No. 81/100,631 disclose microencapsulation of cross-linking agents for polyisocyanates; Japanese Pat. No. 76/147,539 discloses microencapsulation of an ethylene-vinyl acetate copolymer adhesive; U.S. Pat. No. 3,839,220 discloses microencapsulation of fluorocarbons together with reagents for epoxy and polyamide adhesives and coatings German Pat. No. 2,308,850 discloses microencapsulation of liquid anaerobic compositions; and U.S. Pat. No. 4,293,677 discloses microencapsulation of organo- hydrogenpolysiloxane reagents for silicone adhesives and coatings.

It is usual to use physical pressure for rupturing such microscapsules to release the active ingredient, thereby rendering the entire composition active.

The use of high-intensity ultrasound for rupturing the walls of biological cells has been known for a substantial number of years. However in the field of polymer chemistry, the principal industrial use of ultrasound has been for welding of thermoplastic materials.

Japanese Pat. No. 82/63,895 of Tokyo Denki Kagaku Kogyo Co. Ltd. discloses a method for mounting an electronic chip component on a printed circuit board using an adhesive composition which has its curing agent sealed into microcapulses. When the electronic chip component is mounted on the printed circuit board, with the adhesive composition between them, the microcapsule is ultrasonically pulverized to activate the adhesive.

However the method of Japanese Pat. No. 82/63,895 involves the application of ultrasonic oscillations to the solid chip component, through which the oscillations are transmitted to the adhesive composition. The present inventors have found that this method which involves indirect application of ultrasound through a rigid substrate is not generally applicable to other substrates and frequently leads to unsatisfactory bonds. Furthermore the application of ultrasonic oscillations to a rigid chip component or substrate is likely to result in an uncomfortable level of audible sound.

SUMMARY OF THE INVENTION

The present invention provides a method of activating a chemical composition in which one or more of the active ingredients is microencapsulated, which method comprises directly applying ultrasonic energy to the composition to rupture the microcapsules. Preferably, the method comprises directly contacting an ultrasonic device to the composition, and sonicating the composition. Most suitably, the ultrasonic device is immersed in the composition; alternatively the ultrasonic device may comprise chamber walls containing the composition. The ultrasonic device may suitably be of known type, for example an ultrasonic horn or a device incorporating a vessel which itself applies the ultrasonic power to the composition.

According to one aspect, the present invention provides a method of bonding in which an adhesive composition containing one or more microencapsulated ingredients is passed to a sonication chamber, ultrasonic power is applied to the composition in the sonication chamber to rupture the microcapsules, and the composition is then supplied from the sonication chamber to the bonding site before the adhesive sets. Preferably the composition flows through a sonication cell to a dispensing outlet; more particularly, the composition is caused to flow through the sonication cell and ultrasonic power is simultaneously applied to it, whenever a supply of adhesive is required at the dispensing outlet for bonding purposes.

According to another aspect, the present invention provides a method of activating a sealing composition containing one or more microencapsulated ingredients which method comprises direct application of ultrasonic energy to the composition in its sealing location. This aspect of the invention is particularly suited for potting compositions.

The ultrasonic energy is normally provided by a high power ultrasonic transducer, as described and illustrated in Kirk-Othmer, Encyclopedia of Chemical Technology (3rd Ed.) Vol. 23, page 462 (Wiley Interscience) 1983. The frequency is preferably in the range of 15-60 kHz, more particularly 20-30 kHz. The power output is preferably in the range 150-750 watts, more particularly 300-600 watts. The sonication may be carried out for a period of 10-60seconds, for example.

The sonication time and/or power output is chosen so as to release a sufficient quantity of the active ingredient from the microcapsules to cause the composition to set within an acceptable period of time, according to the circumstances.

The invention is applicable generally to compositions containing microencapsulated active ingredients including particularly those described in the prior partents listed in the second paragraph of this Specification. The use of microencapsulated active ingredients in adhesive or sealant compositions has the generally-recognized advantage that the composition can be stored prior to use without danger of the composition setting up. However it has generally been necessary in the past to apply physical pressure to the composition in its bonding or sealing location, in order to activate the composition. This requirement has limited the usefulness of such compositions.

The present invention enables the microcapsules to be ruptured in situ or in a dispensing device, with the resulting advantage that compositions containing microencapsulated ingredients can be used more widely. In the case of adhesive compositions, the application of ultrasound to the composition while it is flowing, prior to its deposit at the bonding site, enables the microcapsules to be ruptured by a relatively small amount of energy, without any risk of the ultimate bond being disrupted by the ultrasonic power.

BRIEF DESCRIPTION OF THE DRAWING

The accompanying drawing is a schematic diagram of apparatus for use in the method of the invention. The apparatus comprises a sonication cell 1 which receives a sonic probe 2 coupled to an ultrasonic transducer 3. The mouth of the cell 1 is sealed by an O-ring 4 around the neck of the sonic probe 2. The cell 1 has a composition inlet 5, a compressed air inlet 6, and a composition outlet 7. The composition 8 containing one or more microencapsulated ingredients is supplied to the cell through the inlet 5 to a depth such that the top of the probe 2 is immersed in the composition. Ultrasonic power is then applied to the composition by the probe 2, after which the outlet 7 is opened and the composition flows out of the cell before it has set, assisted if necessary by compressed air applied at inlet 6.

DESCRIPTION OF THE PREFERRED EMBODIMENTS

The invention is illustrated in the following Examples. Examples 1-4 relate to adhesive-type formulations while Examples 5-11 relate to potting-type formulations which have the ability to cure in situ, for sealing electronic components for example.

EXAMPLE 1

Two formulations were prepared each consisting of 30.0 grams of hydroxypropyl methacrylate; 0.3 gram of ferrocene; and 0.3 gram of 50% benzoyl peroxide in dibutyl phthalate plasticizer microencapculated in gelatin-gum arabic spheres of average size 250-850 microns. Each formulation was poured into a 100 ml polyethylene beaker. In one beaker a 19 mm diameter titanium ultrasonic probe was immersed to a depth of 20 mm. The probe was coupled to the transducer of an ultrasonic homogenizer (Labsonic 2000, trademark of B. Braun Instruments) of frequency 20 kHz operating at full power output (300 watts). After 60 seconds sonication the contents of the beaker had polymerized to a gel. In the other beaker a paddle stirrer was immersed and the contents stirred at 300 r.p.m. with heating applied to raise the temperature of the contents to 65° C. After 2 hours the contents of the beaker remained liquid. This example illustrates that the effects of ultrasound on formulations containing microencapsulated reagents are not due merely to bulk heating and mixing effects.

EXAMPLE 2

Formulations were prepared consisting of 30.0 grams of hydroxypropyl methacrylate (HPMA); 1.0 gram of fumed silica (Aerosil 380, trademark of Degussa G.m.b.H.); 0.3 gramd of 50% benzoyl peroxide in dibutyl phthalate plasticizer microencapsulated in gelatin-gum arabic spheres of average size 250-850 microns and varying amounts of p-tolylimino diethanol (TIDE) as shown in Table I. The formulations were poured into 100 ml polyethylene beakers and a 19 mm diameter titanium ultrasonic probe was immersed in the formulation to a depth of 20 mm. The probe was coupled to the transducer of an ultrasonic homogenizer (Labsonic 2000, trademark of B. Braun Instruments) operating at full power output (300 watts). Formulations were sonicated for a period of 40 seconds, after which a sample was withdrawn and applied to lapshear specimens.

Pairs of mild steel grit-blasted lapshears, 2 centimeters wide, were coated on one face with the sonicated formulations. The coated surfaces of each pair were firmly placed in contact to give a 0.5 inch (1.27 cm) overlap in the length direction of the lapshears for an adhesive bond to develop in the overlapping area. In certain experiments wire spacers were introduced between the lapshears to give gaps of 0.4 mm, 0.7 mm, or 1.0 mm. The bonds were left for 24 hours at room temperature to cure. Bond strengths were measured in the tensile shear mode, using conventional tensile testing equipment. Results are summarized in Table I.

TABLE I

| Amount of TIDE, g | Average Tensile Shear Strength, DaN/cm$^2$ | | |
|---|---|---|---|
| | 0 mm | 0.4 mm | 1.0 mm |
| 0.02 | 42 | 46 | 41 |
| 0.03 | 61 | 74 | 51 |
| 0.1 | 59 | — | 45 |
| 0.4 | 91 | 76 | 55 |

EXAMPLE 3

The experiment described in Example 2 was repeated except that: (1) 0.005 gram ferrocene was used in place of TIDE in all formulations: (2) varying amounts of hydroxypropyl methacrylate and a mixture of urethane-acrylate resins were used as shown in Table II; and (3) a sonication time of 45 seconds was used.

The mixture of urethane-acrylate resins comprised: (i) a polymerizable block copolymer prepared by first reacting a flexible polymeric methylene ether diol with a molar excess of di-isocyanate such as toluene diisocyanate so that the product had an —NCO group at each end of the diol, the product of the reaction being reacted with a molar equivalent of hydroxyalkyl methacrylate to form a flexible dimethacrylate block copolymer as disclosed in Baccei, U.S. Pat. No. 4,309,526, and (ii) a urethane-acrylate resin of the type disclosed in U.S. Pat. No. 3,425,988.

TABLE II

| Amount of HPMA, g | Amount of Resin, g | Average Tensile Shear Strength, DaN/cm$^2$ | | |
|---|---|---|---|---|
| | | 0 mm | 0.4 mm | 0.7 mm |
| 25 | 5 | — | 70 | 70 |
| 20 | 10 | 112 | 103 | 87 |
| 15 | 15 | 144 | 91 | 79 |

EXAMPLE 4

The experiment described in Example 2 was repeated except that: (1) 0.005 gram ferrocene was used in place of TIDE in all formulations; (2) formulations were poured into 50 ml polyethylene beakers and the probe immersed to a depth of 30 mm; and (3) sonication times were varied as shown in Table III.

TABLE III

| Sonication Time, sec | Avg. Tensile Shear Strength, DaN/cm$^2$ (0 mm) |
|---|---|
| 10 | 51 |
| 20 | 85 |

TABLE III-continued

| Sonication Time, sec | Avg. Tensile Shear Strength, DaN/cm² (0 mm) |
|---|---|
| 30 | 107 |
| 40 | 113 |
| 50 | 123 |
| 60 | 116 |

EXAMPLES 5-8

Formulations were prepared each consisting of 5 grams of hydroxy terminated polydimethylsiloxane of viscosity shown in Table IV; 0.2 grams of stannous octoate; and 0.5 grams of partially hydrolyzed tetraethoxy silane (TES-40, trademark of Wacker Chemie) microencapsulated in gelatin-gum arabic spheres of average size 500–700 microns. Each formalation was poured into a 10 ml glass vial and a 12 mm diameter titanium ultrasonic probe was immersed in the formulation to a depth of 5 mm. The probe was coupled to the transducer of a hand-held ultrasonic pistol (Mecasonic) of frequency 30 kHz and power output 600 watts. Sonication times were varied as shown in Table IV. The time taken for the formulation to form an insoluble gel is also listed in Table IV along with the Shore A hardness of the gelled material.

TABLE IV

| Example: | Siloxane viscosity, Centistokes | Sonication Time, Sec. | Gel Time, Min | Shore A Hardness |
|---|---|---|---|---|
| 5 | 35 | 60 | 3.5 | 30 |
| 6 | 35 | 30 | 30 | 32 |
| 7 | 50 | 60 | 5.5 | 30 |
| 8 | 80 | 60 | 2.5 | 26 |

In Example 6 the long gel time is attributable to the shorter sonication time of 30 seconds which did not release sufficient of the TES-40 for the reaction to proceed rapidly.

EXAMPLES 9-10

Formulations were prepared each consisting of 5 grams of hydroxy terminated polydimethylsiloxane of viscosity shown in Table V; 0.5 grams of partially hydrolyzed tetraethoxysilane (TES-40, trademark of Wacker Chemie); and 0.2 grams of stannous octoate microencapsulated in gelatin-gum arabic spheres of average size 500–700 microns. The experiment outlined in Examples 5-8 was performed and the results are shown in Table V.

TABLE V

| Example: | Siloxane Viscosity, Centistokes | Sonication Time, Secs. | Gel Time, Min | Shore A Hardness |
|---|---|---|---|---|
| 9 | 50 | 60 | 2.5 | 32 |
| 10 | 35 | 60 | 3 | 37 |

EXAMPLE 11

A formulatin was prepared consisting of 5 grams of hydroxy terminated polydimethylsiloxane of viscosity 35 centistokes; 0.5 gram of the partially hydrolyzed tetraethoxysilane microcapsules described in Examples 6-9; and 0.2 grams of the stannous octoate microcapsules described in Examples 9-10. The experiment outlined in Examples 5-8 was performed. After 90 seconds of sonication, the formulation gelled within 1 minute to a Shore A hardness of 20.

EXAMPLE 12 (COMPARATIVE EXAMPLE):

Formulations were prepared as described in Example 3 with amounts of HPMA and resin as shown in Table VI below. In each experiment a portion of one formulation was applied to one face of a pair of mild steel gritblasted lapshears 2 centimeters wide. The coated surfaces of each pair were firmly placed in contact with wire spacers inserted to give a gap between the lapshears as shown in Table VI. A 0.5 inch (1.27 cm) overlap in the length direction of the lapshears was maintained. One surface of the assembled lapshears was then coupled to the titanium ultrasonic probe of a hand-held ultrasonic pistol (Mecasonic) operating at 30 kHz with a power output of 600 watts. Power was applied for 9 intervals of 5 seconds each, giving a total sonication time of 45 seconds. The ultimate tensile strengths, recorded in Table VI, are far lower than those obtained by the bulk sonication method of Example 3. This shows that the indirect application of ultrasonic power through a rigid substrate does not result in satisfactory bonding.

TABLE VI

| Amount of HPMA, g | Amount of Resin, g | Average Tensile Shear Strength, DaN/cm² | |
|---|---|---|---|
| | | 0.4 mm | 0.7 mm |
| 20 | 10 | 55 | 21 |
| 15 | 15 | 28 | 4 |

We claim:

1. A method of bonding in which an adhesive composition containing one or more microencapsulated ingredients is passed to a sonication chamber, ultrasonic power is applied to the composition in the sonication chamber to rupture the microcapsules, and the composition is then supplied from the sonication chamber through a dispensing outlet to the bonding site before the adhesive sets.

2. A method according to claim 1, wherein the composition position is caused to flow through the sonication chamber and ultrasonic power is simultaneously applied to it, whenever a supply of adhesive is required at the dispensing outlet for bonding purposes.

3. The method of claim 1 wherein the ultrasonic power is applied to the composition through an ultrasonic device which is immersed in the composition.

4. The method of claim 1 wherein the ultrasonic power is applied to the composition through or by the walls of the sonication chamber.

5. A means for effecting the method of claim 1 comprising a sonication cell and a sonication probe, said sonication cell having a opening or mouth through which is received the sonication probe and said sonication probe and sonication cell thereby defining a sonication chamber into which the adhesive composition containing the microencapsulated ingredients is passed for activation, said sonication chamber being sealed at the mouth of the cell between the cell and the sonication probe by an O-ring and, further, said sonication cell having a composition inlet by which the adhsive composition is flowingly introduced into the sonication chamber, and a composition outlet through which the activated composition is dispensed to the bonding site.

6. The means of claim 5 further comprising a compressed air inlet through which air is introduced into the sonication chamber to assist in dispensing the activated adhesive.

* * * * *